United States Patent [19]

Kenyon et al.

[11] 3,911,290

[45] Oct. 7, 1975

[54] N-PHASE BUCKET BRIGADE OPTICAL SCANNER

[75] Inventors: Richard Arthur Kenyon, Underhill Center; Norbert George Vogl, Jr., Colchester, both of Vt.

[73] Assignee: International Business Machines Corporation, Armonk, N.Y.

[22] Filed: June 10, 1974

[21] Appl. No.: 478,142

[52] U.S. Cl. .......................... 307/221 C; 307/221 D

[51] Int. Cl.$^2$ .......................................... H03K 21/00

[58] Field of Search ........ 307/221 C, 221 D; 357/24

[56] References Cited

UNITED STATES PATENTS 3,763,480 10/1973 Weimer ....................... 307/221 C X 3,764,824 10/1973 Sangster .......................... 307/221 C

*Primary Examiner*—James B. Mullins

*Attorney, Agent, or Firm*—Francis J. Thornton

[57] ABSTRACT

A storage system which uses a bucket brigade shift register as the storage means can be operated so that each basic storage cell, of the register composed of a transistor and a capacitor, can be used as a discrete storage element and can be permitted to store information therein. Information so stored in each cell can be retrieved therefrom without loss or without interference from information stored in the next adjacent cell. This utilization of the entire capacity of the register without loss is achieved by sequentially enabling the phase driver so a series of pulses are created in the register and alternately extracting a bit of stored information from the register.

8 Claims, 2 Drawing Figures

N-PHASE BUCKET BRIGADE OPTICAL SCANNER

BACKGROUND OF THE INVENTION

1. Field of the Invention

This invention related generally to semiconductor device arrays and more particularly to bucket brigade shift registers in which each storage capacitor in the shift register can be used to store information. The array is especially useful when the shift register is used as an optical sensor.

2. Description of the Prior Art

Bucket brigade shift registers which operate based on the concept of transfer of charge deficit from stage to stage have been taught in an article by F. L. J. Sangster, entitled "The Bucket Brigade Delay Line A Shift Register For Analague Signals", which appeared on pages 92–110 of Volume 31, No. 4, 1970, of the Phillips Technical Review.

Broadly the bucket brigade concept taught by Sangster uses as each stage for the register a transistor and a capacitor and operates by causing the charge to be shifted from a full capacitor in one stage to an empty capacitor in the next adjacent stage.

In U.S. Pat. No. 3,621,283 a two phase shift register is taught. In the shift register of this patent only one half of the storage capacitors of the array can contain a signal sample at any given time, thus the information density is but one half.

In U.S. Pat. No. 3,546,490 a greater packing density is taught by modifying the circuit and using a more complex pattern of shift pulses. In this three phase shift register each two stages out of every three can be made to contain information which can be retrieved without loss. Thus the information packing density of the circuit disclosed in this patent is two thirds.

In U.S. Pat. No. 3,603,808 a bucket brigade circuit is described in which successive transistors of opposite conductivity type are driven with alternate positive and negative control pulses to cause the amplitude of the input signal to be independent of the number of stages used in the capacitive store. When two phase clock pulses are used to serially read information from the prior art bucket brigade shift registers the charge levels in pairs of adjacent nodes of either side of the first phase line to be pulsed became summed which effectively averages the information on the first transfer. In this prior art patent two phase operation requires two storage nodes in the array for each bit of information stored in the system. The circuit operation described in this patent thus requires two storage nodes for every bit of stored information and the circuit system in which three phase operation is described required three storage nodes for each two bits of stored information.

SUMMARY OF THE INVENTION

Broadly speaking, the present invention is directed toward a circuit and a technique for maximizing the information capable of being stored and removed from a multi-bit shift register without distortion due to interaction between adjacent bits.

More particularly, the present invention teaches that a bucket brigade shift register can be made to utilize all the available storage nodes and all the stored information can be extracting therefrom without distortion, mixing, or alteration of the stored information.

Still further, the present invention permits the employment of bucket brigade shift registers as optical sensors which uses each storage node in the array as a discrete sense element thus doubling the resolution of the sense image available from the prior art two phase sensors.

This dramatic improvement in resolution in image sensors is realized by driving a bucket brigade shift register sensor with a sequential reference signal and extracting a bit of data from the information for each alternate reference signal put into the system.

Still further the present invention is arranged such that a shift register can have its information storage content doubled and this doubled content can be obtained at the same data rate as is required by the prior art to obtain one half the information.

The present invention realizes this and other benefits by coupling to each stage of the shift register array a sequential phase driver circuit, comprised of a phase driven transistor driving a transistor-capacitor circuit, that will cause a control pulse pattern to be introduced into the array such that each bit of stored information is sequentially transferred from the array without averaging or summing of the bit of information with the bits stored in adjacent nodes.

The present invention achieves these desirable results by operating such a bucket brigade array so that as the information stored in the array is sequentially stepped out the remaining information is expanded into alternate cells. This is achieved by controlling each cell in the register with a sequence of pulses which is delayed in its initiation by one increment of time with respect to the control pulses for the previous cell. This allows the information in the cell adjacent to the output to transfer information out in a two phase manner whereas information which is still closely packed is not clocked out. As the read out process proceeds the closely packed region continually expands in the array until all the remaining information in the array is in alternate cells, when this occurs read out is completed in a two phase mode.

DESCRIPTION OF THE DRAWINGS

These and other features of the present invention will be more fully appreciated and understood by considering the following description taken in conjunction with the accompanying drawings in which.

DESCRIPTION OF THE PREFERRED EMBODIMENT

Figure 1:
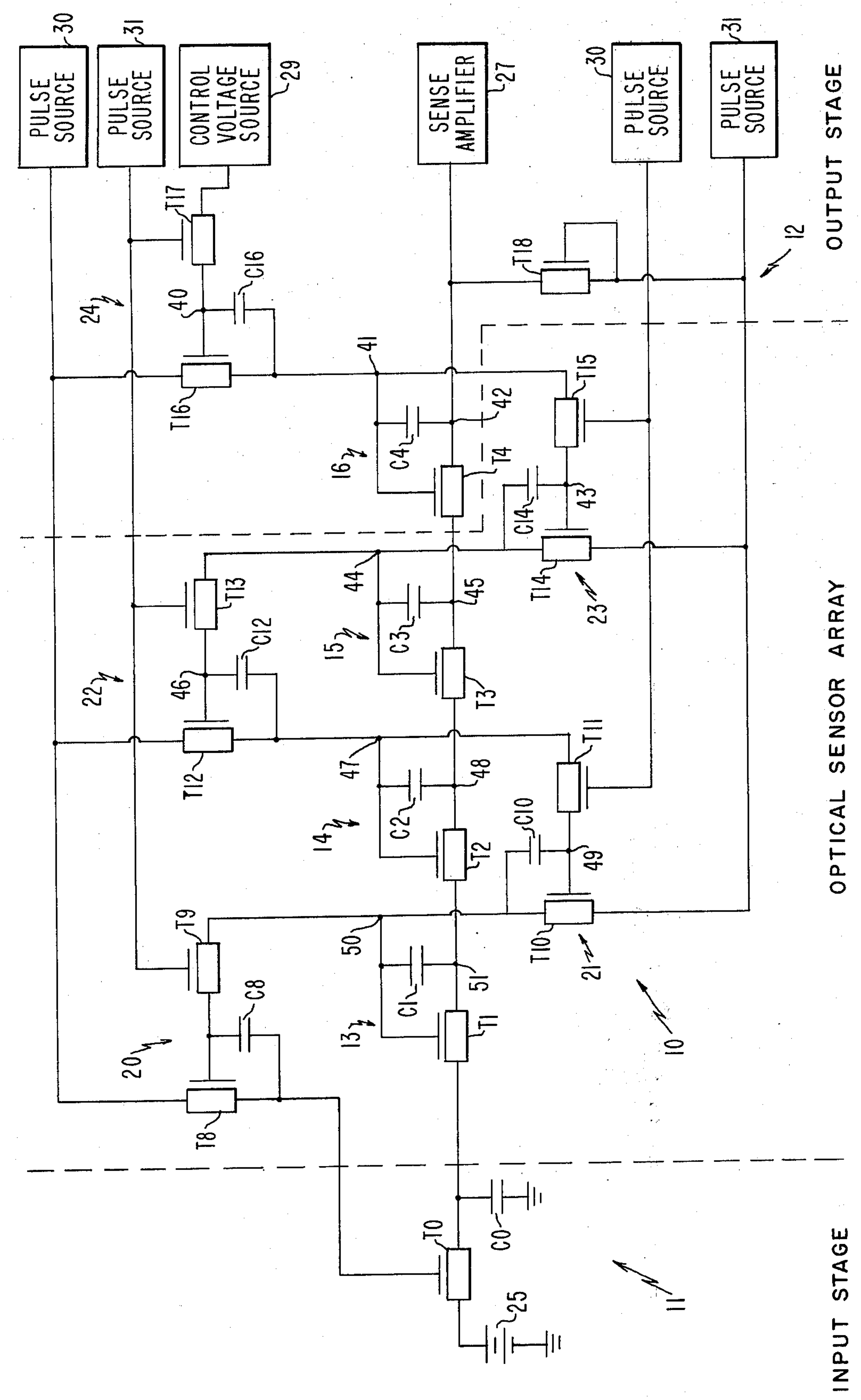
FIG. 1 illustrates, in schematic form, a bucket brigade array in accordance with the present invention.

Referring to the drawings in more detail there is shown in FIG. 1 a schematic layout of a bucket brigade array, together with all the peripheral circuits in accordance with the present invention which array is particularly useful as an optical sensor. The array 10 of the invention has coupled there to an input stage 11 and an output stage 12. The array 10 comprises a series of storage cell circuits 13, 14, and 15, arrayed between the input stage 11 and the output stage 12. It should be understood that for purposes of describing the invention only three storage cells are shown but that many cells can be used in such arrays. Each storage cell circuit comprises a FET Transistor T1, T2, and T3 and a respective capacitor C1, C2, and C3 which is connected between the gate of each transistor and its drain. Interconnected between the gate of each storage transistor and the next adjacent unit is a respective sequential phase driver circuit 20, 21, 22, and 23. Sequential phase driver circuit 20 couples the gate of transistor T1 in the first storage cell circuit 13 to the input stage 11 and sequential phase driver circuit 23 couples the output stage 12 to the gate of transistor T3 in the last storage cell 15.

Each of these sequential phase driver circuits comprises a capacitor and two FET Transistors to which are coupled respective pulse sources. Thus sequential phase driver circuits 20 and 22 are composed respectively of transistors T8 and T9, and T12 and T13 and respective boot-strap capacitors C8 and C12. These sequential phase driver circuits are coupled to pulse supplies 30 and 31. More particularly the pulse supply 30 is connected to the source of transistors T8 and T12 while supply 31 is coupled to the gates of transistors T9 and T13 which have their respective drains coupled to the gates of transistors T8 and T12. The other sequential phase driver circuits 21 and 23 are comprised respectively of transistors T10 and T11, and T14 and T15 together with respective boot-strap capacitors C10 and C14. These sequential phase driver circuits 21 and 23 are also coupled to pulse supplies 30 and 31. More particularly, pulse supply 31 is connected to the source of transistors T10 and T14 while the pulse supply 30 is connected to the gates of transistors T11 and T15 which have their respective drains coupled to the gates of transistors T10 and T14.

The input stage 11 comprises a seven volt power supply shown as battery 25 coupled to the source of an FET Transistor T0 whose gate is connected to the drain of transistor T8 in sequential phase driver 20 and whose drain is coupled through a capacitor $C_0$ to ground and directly to the source of transistor T1 in the first storage cell 13 of the array 10.

The output stage 12 comprises an output cell 16, identical to the storage cells 13, 14, and 15, composed of transistor T4 and capacitor C4. This output cell 16 is coupled between the last cell 15 of the array 10 and a sense amplifier 27 coupled to the drain of transistor T4. Coupled to the gate of transistor T4 is a sequential phase driver circuit 24 containing transistors T16 and T18 together with a boot-strap capacitor C16. The source of transistor T16 is coupled to the pulse supply 30 while its gate is coupled to the drain of transistor T17 which has its gate coupled to the pulse supply 31 and its source coupled to a control voltage supply 29. The drain of transistor T16 is connected to gate of transistor T4. Coupled between the drain of transistor T4 and the pulse supply 31 is a diode connected FET Transistor T18.

It should be noted that when used as an optical sensor only the storage cells T1, T2 and T3 are exposed to light and all the other devices shown are shielded by appropriate means.

Figure 2:
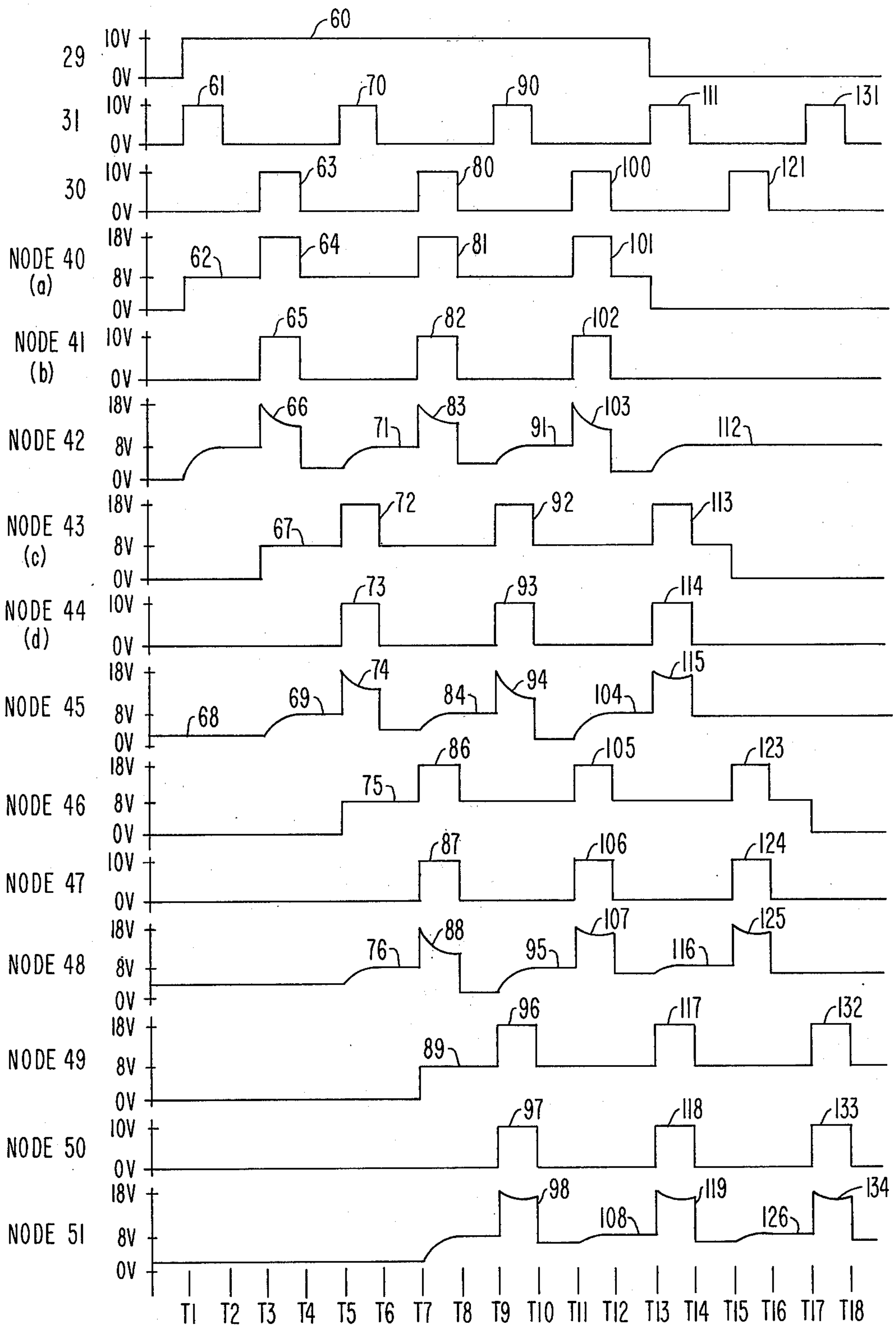
FIG. 2 illustrates voltage wave forms taken at appropriate points in the circuit of FIG. 1 and the information extracted therefrom.

FIG. 2 illustrates, as a function of time, variations in the voltage pulses applied to the circuits of the invention from the various supplies 29, 30, and 31, voltages created by the sequential phase drivers at various nodes 40, 41, 43, 44, 46, 47, 49, and 50 and the voltage in the cells taken at nodes 42, 45, 48, and 51.

The described array, when built in an integrated circuit form, is particularly adapted for use as an optical sensor. When used as such, information is written into the array 10 by exposing the entire array 10 to light such that a charge previously stored in each array cell capacitor C1, C2, and C3 is caused to be discharged in proportion to the amount of light received by each cell. For purposes of convenience in explanation only, we will assume that each of the storage cells 13, 14, and 15 had capacitors C1, C2, and C3 previously charged and then appropriately discharged by exposing these cells to light such that capacitor C3 was discharged to a three volt level (node 45), capacitor C2 to a four volt level (node 48), and capacitor C1 to a two volt level (node 51). Once the information has been so stored in each cell in the array, it must be read out of each cell without interference from any adjacent cell.

If a two phase clock were used to serially read out the information stored in each bucket brigade cell, as taught by the prior art, the charge level in pairs of adjacent cells on either side of the first phase line to be pulsed would be summed, i.e. averaged together on the first transfer and the resolution of the stored information is lost. Thus the best resolution of bucket brigade arrays when read by prior art two phase techniques corresponds to two cells and the sum of the information stored in two adjacent cells is limited to maximum storage level of any one cell in the register. Thus if the maximum storage level of each cell is 1.0 and adjacent cells contain information levels of 0.3 and 0.5 respectively transfer sums the signals to 0.8 and the resolution of the individual signals is lost.

The present invention avoids the above problems encountered by the prior art and achieves full transmittal of all information stored in each cell with summing or averaging as explained more fully below.

The present invention achieves these desirable results by operating such a bucket brigade array so that as the information stored in the array is sequentially stepped out the remaining information is expanded into alternate cells. This is achieved by controlling each cell in the register with a sequence of pulses which is delayed in its initiation by one increment of time with respect to the control pulses for the previous cell. This allows the information in the cell adjacent to the output to transfer information out in a two phase manner whereas information which is still closely packed is not clocked out. As the rear out process proceeds the closely packed region continually expands in the array until all the remaining information in the array is in alternate cells. When this occurs read out is completed in a two phase mode.

This read out is accomplished (as shown in FIG. 2) by applying at time $t1$ a 10 volt signal 60 from control voltage supply 29 to the source of transistor T17. Simultaneously pulse supply 31 applies a 10 volt pulse 61 to the gates of transistor T9, T13, and T17 to turn them on and to the sources of transistors T10, T14, and T18. Turning on of transistor T17 permits node 40 at the drain of transistor T17 and the gate of transistor T16 to rise to 8 volts (pulse 62), and turns on transistor T16. Likewise turning on of transistor T18 forces node 42 at the source of transistor T18 to rise to 8 volts. Although both supplies 29 and 31 are 10 volt supplies node 40 and 42 rise to only 8 volts because of approximately a 2 volt drop due to threshold in the transistors T17 and T18. At time $t2$ the pulse 61 from supply 31 is terminated shutting off transistors T9, T13, and T17. Because node 40 is now isolated it remains at 8 volts.

At time t3 supply 30 applies a ten volt pulse 63 to the gates of transistors T11 and T15 and to the sources of transistors T8, T12, and T16. Because node 40 is at a 8 volt level, and transistor T16 is in a state of conduction, node 41 shown by pulse 65 rises to 10 volts by boot strapping through capacitor C16. The appearance of this 10 volt pulse 65 at node 41 causes, by bootstrap capacitive action, the node 40 to rise from 8 volts to 18 volts, pulse 64. Further the node 42 on the opposite side of capacitor C4 rises by capacitive coupling from 8 volts to 18 volts. Simultaneously, because transistor T15 is conducting, node 43 on the gate of transistor T14 rises to 8 volts as indicated by pulse 67. Pulse 65 on node 41 also causes transistor T4 to be turned on which permits charge to be transferred between node 45, at the source of transistor T3, to node 42 this is indicated by pulse 69. Node 45 charges up to 8 volts at this time because 8 volts is a threshold below the voltage applied to the gate of transistor T4. Thus in the period of time between t3 and t4 while pulse 65 is up node 42 declines from an 18 volt level to a 13 volt level, as indicated by pulse 66, and node 45, as indicated by pulse 69 rises to 8 volts. This 18 volt level on node 42 declines to thirteen volts because as noted above cell C3 had previously been charged to the 3 volt level.

At time t4 termination of pulse 63 also terminates pulses 64 and 65 causing node 42 to be further reduced from the 13 volt level to which it had declined, to a 3 volt level. Thus the three volt charge previously contained within cell 15 has now been transferred to node 42 and is detected at this time by the sense amplifier 27. In this way the information previously in cell 15 has been transferred out of cell 15 and out of the array without loss.

At time t5 supply 31 again is raised to the ten volt level as indicated by pulse 70. This again turns on transistors T9, T13, T17, and T18 and applies a voltage to the sources of transistors T10, T14, and T18. Turning on of transistor T18 causes node 42, as indicated by the pulse 71 to rise to 8 volts. Turning on of transistor T14 causes node 44 to be raised, as indicated by pulse 73, to 10 volts, which in turn causes, by bootstrap action, node 43 to rise 18 volts. The addition of 10 volts at node 44 causes node 45 at the drain of transistor T3 to rise to 18 volts as indicated by pulse 74 and the node 46, at the drain of transistor T13 and the gate of transistor T12 to rise to eight volts, pulse 75. The appearance of this 10 volts on node 46 turns on transistor T12 as shown by pulse 75. The 10 volt pulse 73 at node 44 also turns transistor T3 on and charges now flow through transistor T3 to cause node 45 to decline to 14 volts and node 48 to rise to 8 volts as indicated by curve 76. Node 45 declines to 14 volts because capacitor C2 had been previously charged to the 4 volt level. At time *t*6, pulse 70 from supply 31 is terminated causing node 43 to return to 8 volts, node 44 to return to zero, and node 45 to drop to the 4 volts. Thus the information represented by the 4 volt level of node 48 has been successfully transferred without loss to node 45 and during the next pulse sequence will be again transferred to node 42 where it is detected.

At time *t*7 pulse supply 30 again emits a pulse 80 which passes through transistor T16 and causes node 40 to rise to 18 volts, pulse 81, and node 41 to rise to 10 volts, pulse 82 to turn on transistor T4. As node 41 goes up node 42 rises to 18 volts, as indicated by pulse 83. This pulse 83 declines to the fourteen volts level because of charge transfer with node 45 which had been shifted to four volts during the previous pulse sequence. Simultaneously node 45 rises to 8 volts, as indicated by pulse 84, node 46 rises to 18 volts, pulse 86, and node 47 rises to 10 volts, pulse 87. As node 47 goes to 10 volts node 48, by capacitive action, is caused to rise to 18 volts, pulse 88. The pulse 80 from supply 30 also turns on transistor T11 permitting node 49 to rise to 8 volts, pulse 89.

The ten volts on node 47 turns on transistor T2 and charge is transferred through transistor T2 to raise node 51 from 2 volts to 8 volts and to drive node 48 from 18 volts, as indicated by pulse 88, to 12 volts. At time *t*8 pulses 81, 82, 86, and 87 are terminated and node 48 declines to the 2 volt level previously appearing at node 51, and node 42 declines to the 4 volt level previously appearing at node 45. The sense amplifier 27 again records the 4 volt level impressed upon node 42 indicating that the information originally in node 48 has now been successfully transferred in two steps without loss from node 48 to node 42 and the information previously contained at node 51 has been transferred to node 48.

The cycle is again repeated at time *t*9 by the application of the pulse 90 from supply 31 which causes node 42 to again rise to 8 volts, pulse 91, node 43 to go to 18 volts, pulse 92, and node 44 to 10 volts, pulse 93, and node 45 to go to 18 volts, pulse 94, and node 48 to rise to 8 volts as indicated by pulse 95. Simultaneously, node 49 is raised to 18 volts, indicated by pulse 96, which in turn causes node 50 to rise to 10 volts, indicated by pulse 97, and node 51 to go to 18 volts, indicated by pulse 98.

Because nodes 44 and 50 are high, transistors T1 and T3 are turned on permitting charge to transfer to the next adjacent cell. In this instance charge is transferred through transistor T1 causing node 51 to decline to 17 volts. Simultaneously charge is transferred through transistor T3 causing node 45 to decline to 12 volts and node 48 to rise to 8 volts. At time *t*10 pulse 90 is terminated causing pulses 92, 93, 96, and 97 to also be terminated. As these pulses are ended node 45 declines from 12 volts to 2 volts and node 51 from 17 volts to 7 volts. At this time *t*10 the original 2 volt information state of node 51 has been transferred to node 45. This transfer took two steps from node 51 to 48 at time *t*8 to node 45 at time *t*10.

At time *t*11 pulse supply 30 is again raised to 10 volts indicated by pulse 100 causing node 40 to rise to 18 volts, indicated by pulse 101, and node 41, indicated by pulse 102, to rise to 10 volts. Again this drives node 42, as indicated by pulse 103, to 18 volts. The presence of 10 volts at node 41 turns on transistor T4 which permits node 45 to rise to 8 volts, indicated by pulse 104. At the same time node 47 rises, as shown by pulse 106 to 10 volts to drive, through capacitive action, node 46, pulse 105, to 18 volts. The appearance of this 10 volt pulse 106 at node 47 causes, by capacitive action, a node 48 to go to 18 volts, pulse 107, and to turn on transistor T2 allowing node 51 to rise to 8 volts indicated by pulse 108 and node 48, pulse 107, to decline to 17 volts.

During the duration of pulse 102 on transistor T4 node 42 declines to 12 volts because of the transfer of charge through transistor T4. At time *t*12 when pulse 103 terminated the two volt information state previously contained in node 51 has now been successfully transferred through the entire array to node 42 where it is now detected by the sense amplifier 27.

At this time all the information has been successfully read out of the array and it is now necessary to assure that all of the cells in the array namely cells 13, 14, and 15 are recharged to a 7 volt level so that they can again have information set into them by exposure to light. This is accomplished at time *t*13, by shutting off supply 29 and again turning on supply 31, pulse 111, which causes node 40 to be returned to zero volts and node 42 to be re-established at 8 volts, indicated by pulse 112. Because node 43 is still at 8 volts, supply 31 causes node 44, pulse 114, to rise to 10 volts and capacitively induce 18 volts, pulse 113, at node 43. The appearance of 10 volts at node 44 drives node 45 to 18 volts, as indicated by pulse 115, and also turns on transistor T3 allowing node 48 to rise, as indicated by pulse 116, to 8 volts. The application of pulse 111 from source 31 to transistor T10 also drives node 50, pulse 118, to 10 volts to induce at node 49 to 18 volts as indicated by pulse 117. Pulse 118 at node 50 also turns on transistor T1 causing node 51, as indicated by pulse 119, to rise to 17 volts. At time *t*14 when pulse 111 terminates, node 42 is at 8 volts and nodes 45 and 51 both decline from 17 volts to seven volts. At time *t*15 supply 30 as indicated by pulse 121 induces a 10 volt pulse 121 onto the system and driving node 46, indicated by pulse 123, to 18 volts and node 47, indicated by pulse 124, to 10 volts. At this time node 48, indicated by pulse 125, rises to 18 volts and node 51 to rise to 8 volts as indicated by pulse 126. Also at time *t*15 node 43 returns to zero volts when transistor T15 turns on because the capacitance of node 41 is much larger than capacitor C14. At time *t*16 node 48 has declined to 17 volts and pulses 121, 123, and 124 are terminated and node 48 is reduced from 17 volts to 7 volts. Node 40 remains at zero volts because supply 29 is at zero volts.

At this time nodes 42, 45, and 47 are all at 7 volts indicating that cells 14 and 15 have been restored. At time *t*17 pulse 131 is applied by supply 31 to the array causing node 49 to rise to 18 volts, indicated by pulse 132, and node 50, indicated by pulse 133, to again rise and drive node 51, indicated by pulse 134, to 18 volts and pulse 46 returns to zero volts. At time *t*18 when pulse 131 is terminated node 51 which has declined to 17 volts is returned to 7 volts. At this time *t*18 all the cells in the array, namely cells 13, 14, and 15, are at a 7 volt level and are once again ready to be written into. Subsequently on the next cycle of pulse 30 node 49 returns to 0 volts.

There has now been described a complete storage system which uses a bucket brigade shift register as the storage means, and which has been operated such that when each basic storage cell of the register is used as a discrete storage element the information so stored can be retrieved from each cell without loss and without interference from information stored in the next adjacent cell. This has been accomplished by sequentially stepping the information out of the register by feeding into the cell a sequence of pulses which are delayed with respect to the next adjacent cell such that a cell is emptied of information before information is transferred into it from a next adjacent cell.

While the invention has been particularly shown and described with reference to the preferred embodiment thereof it will be understood by those skilled in the art that various changes in forms and details of the circuit and the method of producing the desired pulse sequence may be made therein without departing from the spirit and scope of the invention and that the method is no way restricted by the apparatus.

What is claimed is:

1. A storage system comprising, a series shift register array composed of a plurality of capacitive charge transfer cells serially arranged between an input terminal and an output terminal, each cell storing a single bit of information and consisting of only a transistor having input, output, and control terminals and a storage capacitor connected between the output terminal of the transistor and its control terminal, an input stage coupled to the input terminal of said series shift register, an output stage coupled to the output terminal of said series shift register, first voltage means coupled to the control terminals of alternate cells in the series for introducing into the storage system a first sequence of pulses to cause the information in said alternate cells to be sequentially transferred to cells positioned adjacent said alternate cells, second voltage means coupled to the control terminals of said adjacent cells for introducing into the storage system a second sequence of pulses to cause the information in said adjacent cells to be sequentially transferred into said alternate cells, and a plurality of serially arranged sequential phase driver circuits, each one of said sequential phase driver circuits being coupled to said first voltage means and said second voltage means and between the control terminals of two adjoining charge transfer cells so each pulse in each of said sequences is delayed in its indroduction into a respective cell by an increment of time equal to the respective order of the cell in the series.

2. The apparatus of claim 1 wherein said output stage includes a sense amplifier for detecting the transfer of information out of said shaft register.

3. The apparatus of claim 2 wherein said output stage further includes a capacitive charge transfer cell serially coupled between the output terminal of said series shift register array and said sense amplifier.

4. The apparatus of claim 3 wherein said output stage further includes a sequential phase driver circuit coupled between said capacitive charge transfer cell and a control voltage supply.

5. The apparatus of claim 3 wherein each of said sequential phase driver circuits comprises a first transistor, a second transistor, and a capacitor having first and second terminals, said first transistor having its input terminal coupled to said first means and, its control terminal connected to said first means, and its output connected to the control element of said second transistor and to said first terminal of said capacitor, said second transistor having its input terminal coupled to the other of said voltage means and its ouput terminal connected to the control terminal to one of said cells to the input of another sequential phase driver circuit and to said second terminal of said capacitor.

6. The apparatus of claim 1 wherein said input stage includes a direct current power supply.

7. A storage array comprising three storage cells in series between an input stage and an output stage, each cell comprising a transistor having input, output, and control terminals and a capacitor coupled between the output terminal and the control terminal of the transistor, a series of sequential phase driver circuits coupled between said input stage and said output stage, two pulse means coupled to each of said sequential phase driver circuits for providing to each sequential phase driver circuit two alternating out of phase series of pulses, each phase driver circuit comprised of a phase driven transistor driving a transistor-capacitor circuit, said phase driven transistor having its control electrode coupled to one of said pulse sources and its output coupled to the control electrode of the transistor in the transistor capacitor circuit with the input of the transistor capacitor circuit being coupled to the other of said pulse sources to cause a pulse from said other source to be introduced onto the control electrode of the storage cell circuit such that each bit of stored information in said cells is sequentially transferred from the array.

8. A storage cell comprising three charge transfer cells in series between an input stage and an output stage, each cell comprising a charge transfer transistor having input, output, and control electrodes and a capacitor coupled between the output terminal and the control terminal of the transistor, serially arranged sequential phase driver circuits coupled between said input stage and said output stage, each of said sequential phase driver circuits in said series being coupled between the control terminals of respective cells in said charge transfer cell series, two pulse means coupled to each of said sequential phase driver circuits for providing to each sequential phase driver circuit two alternating out of phase series of pulses, each of said sequential phase driver circuits comprising a first transistor having input, output, and control electrodes and a second transistor having input, output, and control electrodes, said first transistor having its input coupled to one of said pulse sources through another transistor, its control electrode directly connected to said one of said pulse sources and its output connected to the control electrode of said second transistor, said secocnd transistor having its input electrode coupled to the other of said pulse sources and its output coupled to the control electrode of a charge transfer transistor in one of said charge transfer cells, and a capacitor coupled between the control electrode and the output electrode of said second transistor in said phase driver circuit.

* * * * *